Patented Feb. 20, 1945

2,369,948

UNITED STATES PATENT OFFICE 2,369,948

REACTION PRODUCTS OF AN ALDEHYDE AND A TRIAZOLE DERIVATIVE

Gaetano F. D'Alelio, Pittsfield, Mass., assignor to General Electric Company, a corporation of New York No Drawing. Application November 25, 1942, Serial No. 466,918

20 Claims. (Cl. 260—42)

This invention relates to the production of new synthetic materials and especially to new reaction products having particular utility in the plastics and coating arts. Specifically the invention is concerned with compositions of matter comprising a condensation product of ingredients comprising an aldehyde, including polymeric aldehydes, hydroxyaldehydes and aldehyde-addition products, e. g., formaldehyde, paraformaldehyde, aldol, glucose, dimethylol urea, trimethylol melamine, etc., and a triazole derivative corresponding to the following general formula:

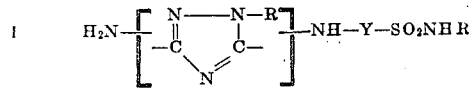

In the above formula R represents a member of the class consisting of hydrogen and monovalent hydrocarbon radicals, and Y represents a member of the class consisting of divalent aromatic and nuclearly substituted, more particularly nuclearly halogenated, aromatic hydrocarbon radicals. Instead of the derivatives of the 1,2,4-triazoles represented by the above formula, corresponding derivatives of the 1,2,3-triazoles, the 1,2,5-triazoles or of the 1,3,4-triazoles may be employed.

Illustrative examples of monovalent hydrocarbon radicals that R in Formula I may represent are: aliphatic (e. g., methyl, ethyl, propyl, isopropyl, butyl, secondary butyl, isobutyl, butenyl, amyl, isoamyl, hexyl, octyl, allyl, methallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, propenylphenyl, tertiary-butylphenyl, methylnaphthyl, etc.); and aryl-substituted aliphatic (e. g., benzyl, cinnamyl, phenylethyl, phenylpropyl, etc.). Preferably R represents hydrogen, in which case the compounds correspond to the following general formula:

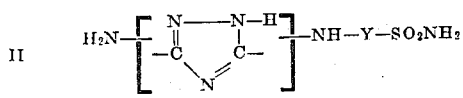

where Y has the same meaning as given above with reference to Formula I. However, there also may be used in practicing the present invention chemical compounds corresponding to the following general formula:

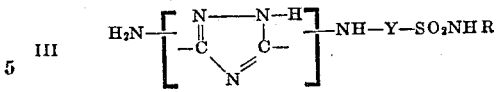

where Y and R have the same meanings as given above with reference to Formula I.

Illustrative examples of divalent radicals that Y in the above formulas may represent are: divalent aromatic, e. g., phenylene, xenylene, naphthylene, etc.; divalent aliphatic-substituted aromatic, e. g., 2,4-tolylene, ethyl 2,5-phenylene, isopropyl 3,4-phenylene, 1-butyl 2,4-naphthylene, 1,4-dimethyl 2,3-phenylene, etc.; radicals that may be classed either as divalent aliphatic-substituted aromatic or divalent aromatic-substituted aliphatic, the free bond of the aromatic nucleus being attached to the sulfamyl radical, e. g., 4,alpha-tolylene, 3,beta-phenylene ethyl, 4,alpha - xylylene, 2,gamma - phenylene - butyl, etc.; and their homologues, as well as those divalent radicals with one or more of their nuclear hydrogen atoms replaced by a substituent, e. g., acyl, alkyl, alkenyl, hydroxy, alkoxy, aryloxy, carboalkoxy, carboaroxy, a —SO₂NHR grouping in addition to the single —SO₂NHR grouping shown in the above formula, etc. Specific examples of substituted divalent radicals that Y may represent are chlorophenylene, bromophenylene, chloroxenylene, chloronaphthylene, chlorotolylene, bromotolylene, ethoxyphenylene, acetophenylene, acetoxyphenylene, aminophenylene, carboethoxyphenylene, carbophenoxyphenylene, hydroxyphenylene, phenoxyphenylene, methylphenylene (tolylene), allylphenylene, etc. Preferably Y is phenylene or tolylene.

The triazole derivatives that are employed in carrying the present invention into effect are more fully described and are specifically claimed in my copending application Serial No. 466,919, filed concurrently herewith and assigned to the same assignee as the present invention. As pointed out in this copending application, a method of preparing the triazole derivatives used in practicing the present invention comprises effecting reaction under heat between a hydrazine corresponding to the general formula NH₂—NHR, where R has the same meaning as given above with reference to Formula I, and a sulfamylarylbiguanide corresponding to the general formula

where R and Y have the same meanings as given above with reference to Formula I. This reaction is carried out under conditions such as will result in the formation of ammonia or, if an acid is present, an ammonium salt as a by-product of the reaction.

Specific examples of compounds embraced by Formula I that may be used in practicing my invention are listed below:

The sulfamylanilino amino 1,2,4-triazoles, including 3-(ortho-sulfamylanilino) 5-amino 1,2,4-triazole; 3-amino 5-(ortho-sulfamylanilino) 1,2,4-triazole; 3-(meta-sulamylanilino) 5-amino 1,2,4-triazole; 3-amino 5-(meta-sulfamylanilino) 1,2,4-triazole; 3-(para-sulfamylanilino) 5-amino 1,2,4-triazole; and 3-amino 5-(para-sulfamylanilino) 1,2,4-triazole
1-methyl 3-(ortho-sulfamylanilino) 5-amino 1,2,4-triazole
1-methyl 3-amino 5-(ortho-sulfamylanilino) 1,2,4-triazole
1-methyl 3-(meta-sulfamylanilino) 5-amino 1,2,4-triazole
1-methyl 3-amino 5-(meta-sulfamylanilino) 1,2,4-triazole
1-phenyl 3-(ortho-sulfamylanilino) 5-amino 1,2,4-triazole
1-phenyl 3-amino 5-(ortho-sulfamylanilino) 1,2,4-triazole
1-phenyl 3-(meta-sulfamylanilino) 5-amino 1,2,4-triazole
1-phenyl 3-amino 5-(meta-sulfamylanilino) 1,2,4-triazole
Ortho-(methylsulfamyl)-anilino amino 1,2,4-triazoles
Meta-(methylsulfamyl)-anilino amino 1,2,4-triazoles
Sulfamyltoluido amino 1,2,4-triazoles
1-ethyl sulfamylanilino amino 1,2,4-triazoles
1-methyl sulfamyltoluido amino 1,2,4-triazoles
1-phenyl sulfamyltoluido amino 1,2,4-triazoles
1-methyl methylsulfamyltoluido amino 1,2,4-triazoles
1-phenyl ethylsulfamyltoluido amino 1,2,4-triazoles
Sulfamylxylidino amino 1,2,4-triazoles
1-methyl sulfamylxylidino amino 1,2,4-triazoles
1-isobutyl sulfamylanilino amino 1,2,4-triazoles
1-allyl sulfamylanilino amino 1,2,4-triazoles
1-propenyl sulfamylanilino amino 1,2,4-triazoles
1-cyclohexyl sulfamylanilino amino 1,2,4-triazoles
1-tolyl sulfamylanilino amino 1,2,4-triazoles
1-xylyl sulfamylanilino amino 1,2,4-triazoles
Sulfamyl-(chloro)-anilino amino 1,2,4-triazoles
Sulfamyl-(bromo)-toluido amino 1,2,4-triazoles
Sulfamyl-(iodo)-anilino amino 1,2,4-triazoles
Sulfamyl-(fluoro)-anilino amino 1,2,4-triazoles
1-phenethyl sulfamylanilino amino 1,2,4-triazoles
1-ethylphenyl sulfamylanilino amino 1,2,4-triazoles
1-methyl propylsulfamylanilino amino 1,2,4-triazoles
1-phenyl naphthylsulfamylanilino amino 1,2,4-triazoles
1-phenyl phenylsulfamylanilino amino 1,2,4-triazoles
Sulfamylnaphthylamino amino 1,2,4-triazoles
1-methyl sulfamylnaphthylamino amino 1,2,4-triazoles
Sulfamylxenylamino amino 1,2,4-triazoles
1-methyl 3-(para-sulfamylanilino) 5-amino 1,2,4-triazole
1-methyl 3-amino 5-(para-sulfamylanilino) 1,2,4-triazole
1-phenyl 3-(para-sulfamylanilino) 5-amino 1,2,4-triazole
1-phenyl 3-amino 5-(para-sulfamylanilino) 1,2,4-triazole
3-[para-(methylsulfamyl) - anilino] 5 - amino 1,2,4-triazole
3-amino 5-[para - (methylsulfamyl) - anilino] 1,2,4-triazole
3-(4'-sulfamylnaphthyl-1' amino) 5-amino 1,2,4-triazole
3-amino 5-(4'-sulfamylnaphthyl-1' amino) 1,2,4-triazole
Sulfamyl-(ethyl)-anilino amino 1,2,4-triazoles It will be understood, of course, by those skilled in the art that, in those compounds listed above which are generically named, the amino grouping may be attached to either the 3 or the 5 carbon atom of the triazole nucleus, the carbon atom which is not joined to an amino grouping being attached to the sulfamylarylamino grouping; and, also, that the sulfamyl grouping may be attached to any of the reactive carbon atoms of the aromatic nucleus.

The present invention is based on my discovery that new and valuable materials having particular utility in the plastics and coating arts can be produced by effecting reaction between ingredients comprising essentially an aldehyde, including polymeric aldehydes, hydroxyaldehydes and aldehyde-addition products, and a triazole derivative of the kind embraced by Formula I, numerous examples of which have been given above and in my copending application Serial No. 466,919.

Resins made by condensing an aldehyde with guanazole (3,5-diamino 1,2,4-triazole) and 1-substituted guanazoles, e. g., 1-phenyl guanazole, are not entirely satisfactory for use in many applications, for instance in the production of molding compounds having a high plastic flow combined with a rapid cure under heat to an insoluble, infusible state. Surprisingly it was found that the heat-curable resinous condensation products of this invention and molding compositions made therefrom show excellent flow characteristics during a short curing cycle. This is a property that is particularly desirable in a thermosetting resin and molding compound. The molded articles have a high dielectric strength and excellent resistance to arcing. They have a good surface finish and, in most cases, a better resistance to water than the ordinary urea-aldehyde resins. The cured resins have a high resistance to heat and abrasion. Hence they are especially suitable for use where optimum heat- and abrasion-resistance are of primary importance.

In practicing my invention the initial condensation reaction may be carried out at normal or at elevated temperatures, at atmospheric, subatmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, I may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde - non - reactable nitrogen - containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the triazole derivative may be carried out in the presence or absence of solvents or diluents, fillers, other natural or synthetic resinous bodies, or while admixed with other materials that also can react with the aldehydic reactant or with the triazole derivative, e. g., ketones, urea, thiourea, selenourea, iminourea (guanidine), substituted ureas, thioureas, selenoureas and iminoureas, numerous examples of which are given in various copending applications of mine, for instance in my copending application Serial No. 363,037, filed October 26, 1940, now Patent No. 2,322,566, issued June 22, 1943; monoamides of monocarboxylic and polycarboxylic acids and polyamides of polycarboxylic acids, e. g., acetamide, halogenated acetamides (e. g., a chlorinated acetamide), maleic monoamide, malonic monoamide, phathalic monoamide, maleic diamide, fumaric diamide, malonic diamide, itaconic diamide, succinic diamide, the monoamide, diamide and triamide of tricarballylic acid, etc.; aminotriazines, e. g., melamine, ammeline, ammelide, melem, melam, melon, numerous other examples being given in various copending applications of mine, for instance in application Serial No. 377,524, filed February 5, 1941, and in applications referred to in said copending application; phenol and substituted phenols, e. g., the cresols, the xylenols, the tertiary alkyl phenols and numerous other phenols such as mentioned in my Patent No. 2,239,441, issued April 22, 1941; monohydric and polyhydric alcohols, e. g., butyl alcohol, amyl alcohol, isoamyl alcohol, heptyl alcohol, octyl alcohol, 2-ethylbutyl alcohol, ethylene glycol, glycerine, polyvinyl alcohol, etc.; amines, including aromatic amines, e. g. aniline, etc.; and the like.

The modifying reactants may be incorporated with the triazole derivative and the aldehyde by mixing all the reactants and effecting condensation therebetween or by various permutations of reactants as described, for example, in my Patent No. 2,281,559, issued May 5, 1942 (page 2, column 1, lines 49-69), with particular reference to reactions involving a non-haloacylated urea, a haloacylated urea and an aliphatic aldehyde. For instance, I may form a partial condensation product of ingredients comprising (1) urea or melamine or urea and melamine, (2) a triazole derivative of the kind embraced by Formula I, e. g., a sulfamylanilino amino 1,2,4-triazole (ortho-, meta- or para-sulfamylanilino amino 1,2,4-triazole), which also may be named sulfamylphenylamino amino 1,2,4-triazole and which includes within its meaning 3-(ortho-, meta- or para-sulfamylanilino) 5-amino 1,2,4-triazole and 3-amino 5-(ortho-, meta- or para-sulfamylanilino) 1,2,4-triazole, a 1-alkyl sulfamylanilino amino 1,2,4-triazole, a 1-aryl sulfamylanilino amino 1,2,4-triazole, etc., and (3) an aldehyde, including polymeric aldehydes, hydroxyaldehydes and aldehyde-addition products, for instance formaldehyde, paraformaldehyde, glyceraldehyde, dimethylol urea, a polymethylol aminotriazine, e. g., trimethylol melamine, hexamethylol melamine, etc. Thereafter I may effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting resinous condensation products, alone or mixed with fillers, pigments, lubricants, plasticizers, curing agents, etc., may be used, for example, in the production of molding compositions.

The liquid intermediate condensation products of this invention may be concentrated or diluted further by the removal or addition of volatile solvents to form liquid coating compositions of adjusted viscosity and concentration. The heat-convertible or potentially heat-convertible resinous condensation products may be used in liquid state, for instance as surface-coating materials, in the production of paints, varnishes, lacquers, enamels, etc., for general adhesive applications, in producing plywood (bonded sheets of wood veneer) and other laminated structures, and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how the present invention may be carried into effect, the following examples are given by way of illustration and not by way of limitation. All parts are by weight.

*Example 1*

| | Parts |
|---|---|
| Para-sulfamylanilino amino 1,2,4-triazole | 76.2 |
| Aqueous, formaldehyde (approx. 37.1% HCHO) | 72.9 |
| Aqueous ammonia (approx. 28% NH₃) | 9.0 |
| Sodium hydroxide in 15 parts water | 0.3 | were heated together under reflux at the boiling temperature of the mass for 30 minutes, yielding a clear, colorless syrup that showed a tendency to gel upon cooling to room temperature. A transparent, thermoelastic resin was produced by dehydrating a portion of the syrup at 140° to 150° C. A thermosetting resin was obtained by incorporating chloroacetamide (monochloroacetamide), glycine, sulfamic acid or other curing agent such as hereafter mentioned either into the initial syrupy condensation product or into the dehydrated syrup.

To 115 parts of the syrup prepared as above described was added 0.5 part chloroacetamide, after which the mixture was heated under reflux at boiling temperature for 5 minutes. The resulting hot, resinous syrup was mixed with 35 parts alpha-cellulose in flock form and 0.2 part of a mold lubricant, specifically zinc stearate, to form a molding (moldable) composition. The wet molding compound was dried at 60° C. for one hour. A sample of the dried and ground molding composition was molded for 5 minutes at 130° C. under a pressure of 2,000 pounds per square inch. The molded piece was strong and well cured throughout and had a well-knit and homogeneous structure. The plasticity of the molding compound during molding was very good.

Instead of using chloroacetamide in accelerating the curing of the potentially reactive resinous material, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha, beta-dibromopropionitrile, aminoacetamide hydrochloride, ethylene diamine monohydrochloride, the ethanolamine hydrochlorides, nitrourea, chloroacetyl urea, chloroacetone, sulfamic acid, citric diamide, phenacyl chloride, etc.). Other examples of curing reactants that may be employed to accelerate or to effect the curing of the thermosetting or potentially thermosetting resins of this and other examples are given in various copending applications of mine, for instance in my copending application Serial No. 346,962, filed July 23, 1940, now Patent No. 2,325,375, and Serial No. 354,395, filed August 27, 1940, now Patent No. 2,325,376, both of which applications issued on July 27, 1943, and are assigned to the same assignee as the present invention.

*Example 2*

| | Parts |
|---|---|
| Para-sulfamylanilino amino 1,2,4-triazole | 12.7 |
| Urea | 27.0 |
| Aqueous formaldehyde (approx. 37.1% HCHO) | 81.0 |
| Aqueous ammonia (approx. 28% NH₃) | 2.0 |
| Sodium hydroxide in 4 parts water | 0.08 | were heated together under reflux at the boiling temperature of the mass for 30 minutes. A portion of the resulting clear, viscous syrup was dehydrated by heating at 140° C., yielding a thermoplastic resin. This resin was potentially heat-curable as shown by the fact that when a small amount of a curing agent was incorporated either into the initial syrupy condensation product or into the dehydrated syrup, following by heating on a 140° C. hot plate, the material was converted into an insoluble and infusible state.

After mixing 0.5 part chloroacetamide with 115 parts of the resinous syrup produced as above described, the resulting mixture was refluxed for 5 minutes. A molding composition was prepared from the chloroacetamide-modified syrup in the same manner as mentioned under Example 1. A well-molded piece having good strength and an attractive translucency was obtained by molding a sample of the dried and ground molding compound for 5 minutes at 130° C. under a pressure of 2,000 pounds per square inch. The molding composition showed good plasticity during molding.

*Example 3*

| | Parts |
|---|---|
| Synthetic phenol | 45.0 |
| Aqueous formaldehyde (approx. 37.1% HCHO) | 97.5 |
| Potassium carbonate in 10 parts water | 1.43 |
| Para-sulfamylanilino amino 1,2,4-triazole | 4.5 |

A liquid phenol-formaldehyde partial condensation product was prepared by heating together all of the above ingredients with the exception of the triazole derivative under reflux for 3½ hours at 65° to 70° C. The above-stated amount of para-sulfamylanilino amino 1,2,4-triazole was added to this syrupy phenolic resin and heating under reflux at the boiling temperature of the mass was continued for 1 hour. At the end of this reaction period the resulting syrupy intercondensation product was acidified by adding thereto 1.5 parts oxalic acid dissolved in 20 parts water. A molding compound was made from the acidified syrup by mixing therewith 28.5 parts alpha-cellulose and 0.3 part zinc stearate. The wet molding composition was dried for 1½ hours at 64° C. A well-cured, light-colored molded piece having good water resistance was obtained by molding a sample of the dried and ground molding composition for 5 minutes at 130° C. under a pressure of 2,000 pounds per square inch. The molding compound showed excellent plastic flow during molding.

*Example 4*

| | Parts |
|---|---|
| Para-sulfamylanilino amino 1,2,4-triazole | 25.4 |
| Furfural | 28.8 |
| Sodium hydroxide in 5 parts water | 0.1 |
| Water | 100.0 | were heated together under reflux at the boiling temperature of the mass for 15 minutes, yielding a very viscous, dark-colored resinous mass. This resin cured slowly to an insoluble and infusible state in the absence of a curing agent when a small sample of it was heated on a 140° C. hot plate. The curing of the resin was accelerated by incorporating glycine, citric acid, chloracetamide or other curing agent such as mentioned under Example 1 into the heat-curable resin prior to heating on the hot plate. The resinous composition of this example, especially after modification with a curing agent, may be used in the production of molding compounds.

*Example 5*

| | Parts |
|---|---|
| Para-sulfamylanilino amino 1,2,4-triazole | 25.4 |
| Acrolein | 16.8 |
| Sodium hydroxide in 5 parts water | 0.1 |
| Water | 100.0 | were heated together under reflux at boiling temperature for 15 minutes. The resulting hydrophobic, resinous condensation product had curing characteristics much the same as the resin of Example 4. The cured resin displayed pronounced resistance to water and organic solvents. As in the case of the resin of Example 4, the resinous composition of this example likewise is suitable for use in the preparation of molding compounds.

Example 6

| | Parts |
|---|---|
| Para-sulfamylanilino amino 1,2,4-triazole | 25.4 |
| Butyl alcohol | 74.0 |
| Aqueous formaldehyde (approx. 37.1% HCHO) | 64.8 |
| Sodium hydroxide in 5 parts water | 0.1 |

The above ingredients were heated together under reflux at the boiling temperature of the mass for 30 minutes, yielding a water-white, syrupy condensation product. This syrup bodied to a thermoplastic resin when a sample of it was heated on a 140° C. hot plate. This resin was potentially heat-curable as shown by the fact that when sulfamic acid, citric acid, chloral urea, glycine, phenacyl chloride, chloroacetamide, nitrourea or other curing agent such as mentioned under Example 1 was added either to the syrupy condensation product or to the thermoplastic resin, followed by heating on a 140° C. hot plate, the material cured to an insoluble and infusible state. Hard, tough, transparent films are formed when a glass plate coated with the syrup is baked for several hours at 60° to 70° C. The resinous composition of this example is especially suitable for use in the preparation of liquid coating and impregnating materials.

Example 7

| | Parts |
|---|---|
| Para-sulfamylanilino amino 1,2,4-triazole | 25.4 |
| Diethyl malonate | 16.0 |
| Aqueous formaldehyde (approx. 37.1% HCHO) | 40.5 |
| Sodium hydroxide in 5 parts water | 0.1 | were heated together under reflux at boiling temperature for 15 minutes, yielding a resinous syrup that cured slowly under heat to an insoluble and infusible state when a small sample of it was heated on a 140° C. hot plate. The curing of the syrup under heat was accelerated by incorporating therein a small amount of glycine, chloroacetamide or other curing agent such as mentioned under Example 1. The cured resin showed marked resistance to water and alcohols. The resinous composition of this example may be used in the production of molding compounds or it may be employed in the preparation of various air-drying and baking varnishes and enamels. For example, it may be used as a modifier of varnishes of the aminoplast and alkyd-resin types.

Example 8

| | Parts |
|---|---|
| Para-sulfamylanilino amino 1,2,4-triazole | 25.4 |
| Acetamide | 5.9 |
| Aqueous formaldehyde (approx. 37.1% HCHO) | 32.4 |
| Sodium hydroxide in 5 parts water | 0.1 | were heated together under reflux at the boiling temperature of the mass for 30 minutes, yielding a clear, colorless viscous syrup that bodied to a thermoplastic resin when a sample of it was heated on a 140° C. hot plate. This resin was potentially heat-curable as shown by the fact that the addition of a small amount of sulfamic acid, citric acid, oxalic acid, chloroacetamide, glycine or other curing agent such as mentioned under Example 1 to the initial syrup or to the thermoplastic resin, followed by heating on a 140° C. hot plate, caused the material to convert to a cured or insoluble and infusible state. The excellent plastic flow of the resin during curing indicated that it would be particularly suitable for use as a plasticizer of less plastic aminoplasts and other compatible resins to improve their plasticity or flow characteristics. For example, it may be used as a modifier of urea-aldehyde resins and melamine-aldehyde resins, the flow characteristics of which are unsatisfactory during curing, to improve the plasticity thereof.

Example 9

| | Parts |
|---|---|
| Para-sulfamylanilino amino 1,2,4-triazole | 25.4 |
| Glycerine | 9.2 |
| Aqueous formaldehyde (approx. 37.1% HCHO) | 40.5 |
| Sodium hydroxide in 5 parts water | 0.1 | were heated together under reflux at boiling temperature for 30 minutes, yielding a clear, colorless syrup that bodied to a transparent, thermoplastic resin when a small sample of it was heated on a 140° C. hot plate. Heat-curable resins are prepared by incorporating chloroacetamide, glycine or other curing agent such as mentioned under Example 1 into the initial syrupy condensation product or into the thermoplastic resin. The resinous material of this example may be employed in the preparation of various water-soluble and alcohol-soluble varnishes. Because of its inherent plasticizing characteristics, it also may be used as a flow extender for other compatible aminoplasts and other synthetic resins having unsatisfactory flow characteristics.

Example 10

| | Parts |
|---|---|
| Para-sulfamylanilino amino 1,2,4-triazole | 25.4 |
| Polyvinyl alcohol | 26.4 |
| Aqueous formaldehyde (approx. 37.1% HCHO) | 64.8 |
| Sodium hydroxide in 5 parts water | 0.1 |
| Water | 200.0 |

The above ingredients were heated together under reflux at boiling temperature for 30 minutes, yielding a very viscous, resinous syrup. When a sample of this syrup was dehydrated by heating it on a 140° C. hot plate, a tough, thermoelastic resin was obtained. When a film of this resin was heated at 70° to 80° C. over a period of several hours, the conversion of the resin toward a heat-hardened state was materially advanced.

The pH of the syrup was lowered by adding thereto a small amount of an acid, specifically hydrochloric acid. The acidified syrup was thermosetting, as evidenced by the fact that it cured to an insoluble and infusible state when a small sample of it was heated in film form at 70° to 80° C. for several hours. The baked films were hard, tough and transparent, and showed good resistance to water. Instead of hydrochloric acid, other curing agents such as mentioned under Example 1 may be employed to improve the curing characteristics and the water resistance of the resinous material of this example. The thermoplastic resinous product, either with or without a curing agent, may be used in the preparation of various liquid coating and impregnating compositions. The thermosetting resins may be employed in the production of molding compounds.

It will be understood, of course, by those skilled in the art that the reaction between the aldehyde and the triazole derivative may be effected at temperatures ranging, for example, from room temperature to the fusion or boiling temperature of the mixed reactants or of solutions of the mixed reactants, the reaction proceeding more slowly at normal temperature than at elevated temperatures in accordance with the general law of chemical reactions. Thus, instead of effecting reaction between the ingredients of the above examples under reflux at the boiling temperature of the mass as mentioned in the individual examples, the reaction between the components may be carried out at lower temperatures, for example at temperatures ranging from room temperature to a temperature near the boiling temperature using longer reaction periods and, in some cases, stronger catalysts and higher catalyst concentrations.

It also will be understood by those skilled in the art that my invention is not limited to condensation products obtained by reaction of ingredients comprising an aldehyde and the specific triazole derivative embraced by Formula I that is named in the above illustrative examples. Thus, instead of a para-sulfamylanilino amino 1,2,4-triazole I may use, for example, an ortho-sulfamylanilino amino 1,2,4-triazole, more particularly 3 - (ortho - sulfamylanilino) 5 - amino 1,2,4-triazole or 3-amino 5-(ortho-sulfamylanilino) 1,2,4-triazole, a meta-sulfamylanilino amino 1,2,4-triazole, specifically 3-(meta-sulfamylanilino) 5-amino 1,2,4-triazole or 3-amino 5-(meta-sulfamylanilino) 1,2,4-triazole, a sulfamyltoluido amino 1,2,4-triazole, a sulfamylxylidino amino 1,2,4-triazole, a 1-alkyl (e. g., 1-methyl, 1-ethyl, etc.) sulfamylanilino amino 1,2,4-triazole, a 1-aryl (e. g., 1-phenyl, 1-tolyl, etc.) sulfamylanilino amino 1,2,4-triazole, or any other triazole derivative (or mixture thereof) of the kind embraced by Formula I, numerous examples of which have been given hereinbefore and in my copending application Serial No. 466,919.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, isobutyraldehyde, pentaldehyde, heptaldehyde, capraldehyde, octaldehyde, crotonaldehyde, salicylaldehyde, cinnamaldehyde, benzaldehyde, furfural, methacrolein, aldol, glucose, glyoxal, glycollic aldehyde, glyceric aldehyde, etc., mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives, more particularly the mono- and poly-methylol derivatives of urea, thiourea, selenourea and iminourea, and of substituted ureas, thioureas, selenoureas and iminoureas (numerous examples of which are given in my copending application Serial No. 377,524), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazines, mono- and poly-(N-carbinol) derivatives of the aminodiazines, etc. Particularly good results are obtained with active methylene-containing bodies such as a methylol urea, more particularly mono- and di-methylol ureas, and a methylol aminotriazine, e. g., monomethylol melamine and polymethylol melamines (di-, tri-, tetra-, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the triazole derivative may be varied over a wide range, but ordinarily the reactants are employed in an amount corresponding to at least one mol of the aldehyde, specifically formaldehyde, for each mol of the triazole derivative. Thus, I may use, for example, from 1 to 7 or 8 or more mols of an aldehyde for each mol of triazole derivative. Good results are obtained in manufacturing thermosetting resinous compositions using from about 2 to 4 mols aldehyde, specifically formaldehyde, for each mol of triazole derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance from 2 or 3 up to 15 or 20 or more mols of such alkylol derivatives for each mol of the triazole derivative.

As indicated hereinbefore, and as further shown by a number of the examples, the properties of the fundamental resins of this invention may be varied widely by introducing other modifying bodies before, during or after effecting condensation between the primary components. Thus, as modifying agents I may use, for instance, monohydric alcohols such as methyl, ethyl, propyl, isopropyl, isobutyl, hexyl, etc., alcohols; polyhydric alcohols such as diethylene glycol, triethylene glycol, pentaerythritol, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides such as formamide, stearamide, acrylamide, benzamide, benzene sulfonamides, toluene sulfonamides, adipic diamide, phthalamide, etc.; amines such as ethylene diamine, phenylene diamine, etc.; phenol and substituted phenols, including aminophenols, etc.; ketones, including halogenated ketones; nitriles, including halogenated nitriles; acylated ureas, including halogenated acylated ureas; and others.

The modifying bodies also may take the form of high molecular weight bodies with or without resinous characteristics, for example, hydrolyzed wood products, formalized cellulose derivatives, lignin, protein-aldehyde condensation products, aminotriazine-aldehyde condensation products (e. g., melamine-formaldehyde condensation products), aminodiazine-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a triazole derivative of the kind embraced by Formula I and an aldehyde, specifically formaldehyde, I may cause an aldehyde to condense with a salt (organic or inorganic) of the triazole derivative or with a mixture of the triazole derivative and a salt thereof. Examples of organic and inorganic acids that may be used in the preparation of such salts are hydrochloric, sulfuric, phosphoric, boric, acetic, chloroacetic, propionic, butyric, valeric, acrylic polyacrylic, oxalic, methacrylic, polymethacrylic, malonic, succinic, adipic, malic, maleic, fumaric, benzoic, salicyclic, phthalic, camphoric, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, thin sheets of wood, etc., are coated or coated and impregnated with the resin, superimposed and thereafter united under heat and pressure. They may be employed in the production of wire or baking enamels from which insulated wires and other coated products are made, for bonding or cementing together mica flakes to form a laminated mica article, for bonding together abrasive grains in the preparation of resin-bonded abrasive articles such, for instance, as grindstones, sandpapers, etc., in the manufacture of electrical resistors, etc. They may be used for treating cotton, linen and other cellulosic materials in sheet or other form. They also may be employed as impregnants for electrical coils and for other electrically insulating applications.

What I claim as new and desire to secure by Letters Patent of the United States is:

1. A composition of matter comprising the product of reaction of ingredients comprising an aldehyde and a compound corresponding to the general formula

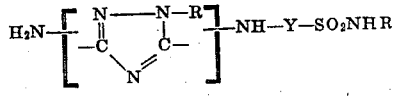

where R represents a member of the class consisting of hydrogen and monovalent hydrocarbon radicals, and Y represents a member of the class consisting of divalent aromatic and nuclearly halogenated aromatic hydrocarbon radicals.

2. A composition of matter comprising the product of reaction of ingredients comprising formaldehyde and a compound corresponding to the general formula

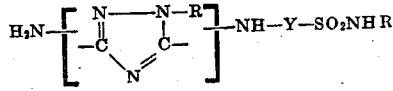

where R represents a member of the class consisting of hydrogen and monovalent hydrocarbon radicals, and Y represents a member of the class consisting of divalent aromatic and nuclearly halogenated aromatic hydrocarbon radicals.

3. A composition of matter comprising the product of reaction of ingredients comprising an aldehyde and a compound corresponding to the general formula

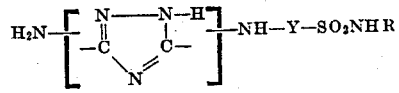

where R represents a member of the class consisting of hydrogen and monovalent hydrocarbon radicals, and Y represents a member of the class consisting of divalent aromatic and nuclearly halogenated aromatic hydrocarbon radicals.

4. A composition as in claim 1 wherein the reaction product is the product obtained by effecting initial reaction between the specified components under alkaline conditions.

5. A composition as in claim 1 wherein the reaction product is an alcohol-modified reaction product of the specified components.

6. A heat-curable resinous composition comprising a heat-convertible condensation product of ingredients comprising formaldehyde and a compound corresponding to the general formula

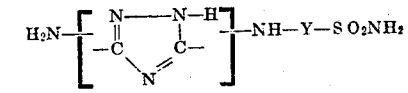

where Y represents a divalent aromatic hydrocarbon radical.

7. A product comprising the cured resinous composition of claim 6.

8. A composition comprising the condensation product of ingredients comprising an aldehyde and a sulfamylanilino amino 1,2,4-triazole.

9. A resinous composition comprising the product of reaction of ingredients comprising formaldehyde and a sulfamylanilino amino 1,2,4-triazole.

10. A resinous composition comprising the condensation product of ingredients comprising an aldehyde and a parasulfamylanilino amino 1,2,4-triazole.

11. A composition comprising the condensation product of ingredients comprising an aldehyde and a sulfamyltoluido amino 1,2,4-triazole.

12. A composition comprising the product of reaction of ingredients comprising a urea, an aldehyde and a compound corresponding to the general formula

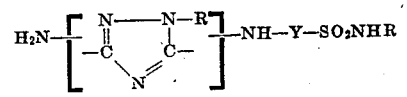

where R represents a member of the class consisting of hydrogen and monovalent hydrocarbon radicals, and Y represents a member of the class consisting of divalent aromatic and nuclearly halogenated aromatic hydrocarbon radicals.

13. A composition comprising the resinous product of reaction of ingredients comprising urea, formaldehyde and a compound corresponding to the general formula

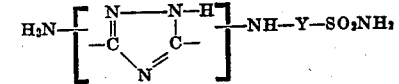

where Y represents a divalent aromatic hydrocarbon radical.

14. A composition comprising the product of reaction of ingredients comprising dimethylol urea and a sulfamylanilino amino 1,2,4-triazole.

15. A composition comprising the product of reaction of ingredients comprising an aminotriazine, an aldehyde and a compound corresponding to the general formula

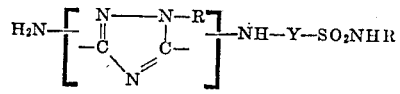

where R represents a member of the class consisting of hydrogen and monovalent hydrocarbon radicals, and Y represents a member of the class consisting of divalent aromatic and nuclearly halogenated aromatic hydrocarbon radicals.

16. A composition comprising the resinous product of reaction of ingredients comprising melamine, formaldehyde and a compound corresponding to the general formula

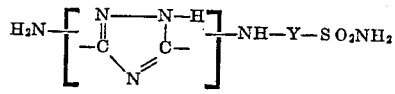

where Y represents a divalent aromatic hydrocarbon radical.

17. A composition comprising the resinous product of reaction of ingredients comprising a urea, an aldehyde and a sulfamylanilino amino 1,2,4-triazole.

18. A heat-curable composition comprising the heat-convertible resinous reaction product of (1) a partial condensation product of ingredients comprising formaldehyde and a compound corresponding to the general formula

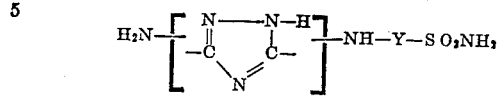

where Y represents a divalent aromatic hydrocarbon radical, and (2) a curing reactant.

19. A product comprising the cured composition of claim 18.

20. The method of preparing new synthetic compositions which comprises effecting reaction between ingredients comprising an aldehyde and a compound corresponding to the general formula

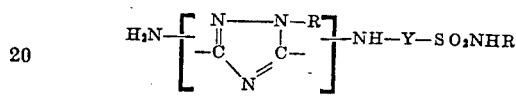

where R represents a member of the class consisting of hydrogen and monvalent hydrocarbon radicals, and Y represents a member of the class consisting of divalent aromatic and nuclearly halogenated aromatic hydrocarbon radicals.

GAETANO F. D'ALELIO.